United States Patent [19]

Kondo

[11] 4,112,450
[45] Sep. 5, 1978

[54] SHUTTER DEVICE FOR A PHOTOGRAPHIC CAMERA

[75] Inventor: Toshihiro Kondo, Chofu, Japan

[73] Assignee: Fuji Photo Film Co., Ltd., Minami-ashigara, Japan; a part interest

[21] Appl. No.: 769,299

[22] Filed: Feb. 16, 1977

[30] Foreign Application Priority Data

Feb. 18, 1976 [JP] Japan ............................ 51-16765
Apr. 12, 1976 [JP] Japan ............................ 51-41135
Apr. 1, 1976 [JP] Japan ............................ 51-36282
Mar. 26, 1976 [JP] Japan ............................ 51-33764
Mar. 31, 1976 [JP] Japan ......................... 51-39255[U]

[51] Int. Cl.² .................. G03B 9/14; G03B 9/24; G03B 9/40; G03B 9/62
[52] U.S. Cl. ................................. 354/235; 354/247; 354/248
[58] Field of Search .............. 354/234, 235, 247, 265, 354/45, 52, 230, 248, 249; 335/222

[56] References Cited

U.S. PATENT DOCUMENTS

| 340,213 | 4/1886 | Hoedemaker et al. ............... 354/247 |
| 3,059,555 | 10/1962 | Krömer et al. ........................ 354/45 |
| 3,176,170 | 3/1965 | Fulton et al. ...................... 354/235 X |
| 3,427,941 | 2/1969 | Metzger .......................... 335/222 X |
| 3,563,142 | 2/1971 | Harvey ............................. 354/52 X |
| 3,696,718 | 10/1972 | Tamaka .............................. 354/45 |
| 3,869,930 | 3/1975 | Forest ............................ 335/222 X |
| 3,927,415 | 12/1975 | Petersen ......................... 354/235 X |
| 3,945,025 | 3/1976 | Stempeck ......................... 354/234 X |
| 4,003,067 | 1/1977 | Brauning ......................... 354/265 X |

Primary Examiner—Michael L. Gellner
Attorney, Agent, or Firm—Harold L. Stults

[57] ABSTRACT

A shutter device for a photographic camera uses an electromagnetic driving means for moving back and forth shutter blades to admit light rays to the film for a controlled length of time. In spite of the use of the electromagnetic driving means the shutter blades can be driven at the same and high speed. If the electromagnetic driving means is operatively connected to a light intensity measuring circuit, the program-control of exposure can be performed.

5 Claims, 27 Drawing Figures

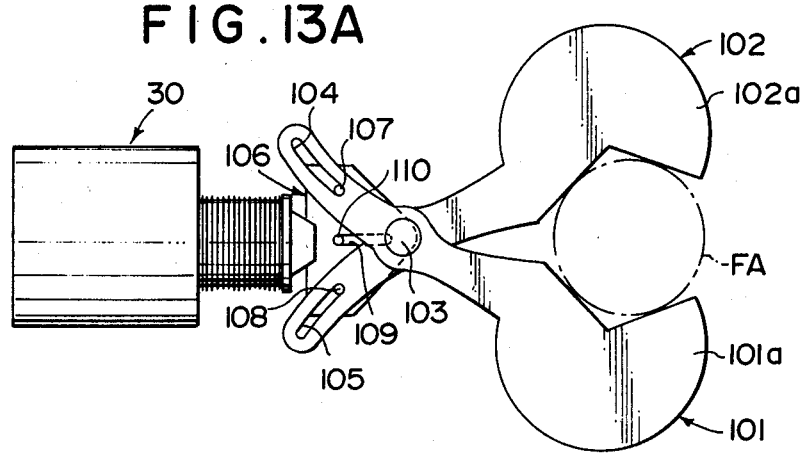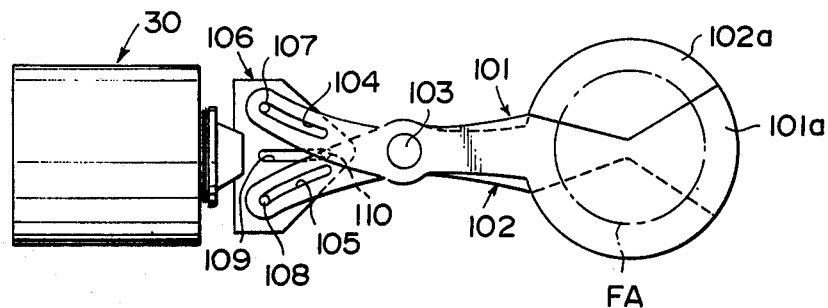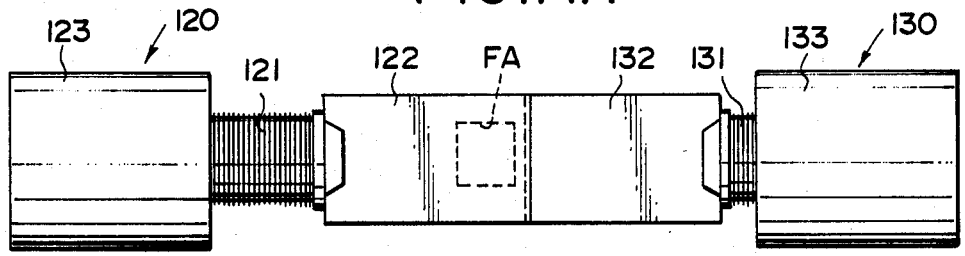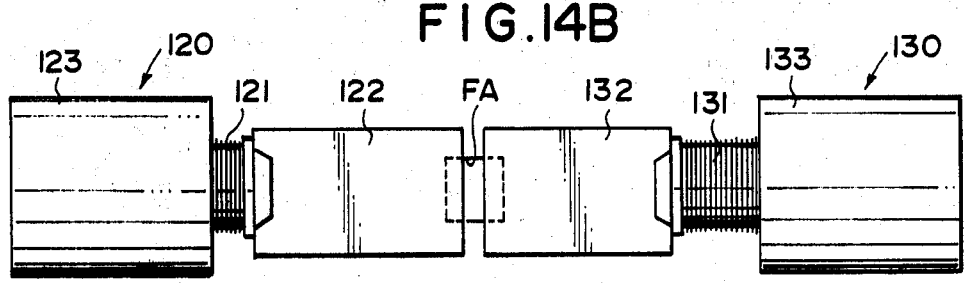

SHUTTER DEVICE FOR A PHOTOGRAPHIC CAMERA

BACKGROUND OF THE INVENTION

1. Field of the Invention

This invention relates to a camera shutter, and more particularly to a camera shutter the shutter blades of which move back and forth between two points of position under the influence of an electromagnetic force.

2. Description of the Prior Art

As is well known in the art, the shutter blades are designed to move back and forth between two points of position, as for instance those in the focal plane shutter. When the shutter release is actuated, the leading shutter blade runs in one direction. After a certain preset interval of time the trailing shutter blade runs in the same direction. In setting the focal plane shutter the leading and trailing shutter blades are made to return to the original position without admitting the light rays to the film. As for the slide type shutter, when the shutter release is actuated, two shutter blades each having an exposure aperture are brought to the aperture-opening position in which the exposure apertures of the shutter blades are laid on each other, and after a certain preset interval of time the shutter blades are brought to the aperture-closing position in which the apertures of the shutter blades are offset from each other.

The mechanical drive has been hitherto used to drive the shutter blades. This requires a relatively complicated structure to interlock and drive two shutter blades in the coordinating relation. Also, a reciprocating mechanism must be provided for each of the two shutter blades, and accordingly the inner structure of the camera is complicated, and hence the production cost is increased.

In an attempt to overcome these defects, it has been proposed that a plunger of an electromagnetic driving unit is connected to the shutter blade for opening and closing the shutter under the influence of the electromagnetic force. Specifically, when the electromagnetic driving unit is energized with electricity, the plunger is moved under the influence of the electromagnetic force, storing a resilient force in a spring. When the electromagnetic driving unit is deenergized, the plunger is returned to the original position under the influence of the resilient force, which is released from the spring. Partly because of the relatively heavy weight of the plunger and partly because of the counter force applied to the plunger by the resilient spring, the shutter blades cannot run at an increased speed. Still disadvantageously, it is difficult that two plungers associated with two shutter blades are made so as to run at the same speed. Because the resilient forces of the springs used cannot be exactly the same, and the electromotive forces to drive the plungers cannot be exactly the same, either.

If the two shutter blades travel at different speeds in the slide shutter, the size of the exposure aperture formed with the shutter blades is not stabilized, thus failing to accurately control the exposure.

SUMMARY OF THE INVENTION

In view of the above, the primary object of this invention is to provide a camera shutter which is simple in structure and less expensive.

Another object of this invention is to provide a camera shutter whose shutter blades are driven under the influence of electromagnetic force alone.

Still further object of this invention is to provide a camera shutter using an electromagnetic driving means which essentially consists of a permanent magnet and a moving coil inserted in between the opposite polarities of the permanent magnet.

Still further object of this invention is to provide a camera shutter which is adapted to reciprocate the shutter blades by alternately connecting to one polarity terminal of a power supply one of the opposite terminals of the moving coil winding after the other while the center tap of the moving coil winding is connected to the other polarity of the power supply.

Still further object of this invention is to provide a single blade type camera shutter having an electromagnetic driving means.

Still further object of this invention is to provide a slide shutter using such an electromagnetic driving means which assures that two shutter blades travel at the same speed, thus assuring controlled exposure.

Still further object of this invention is to provide a slide shutter in which two shutter blades are so ganged or interlocked with each other that if one of the two shutter blades is moved in one direction the other shutter blade is moved in the other direction at the same speed.

Still further object of this invention is to provide a slide shutter using a rack and pinion for ganging or interlocking two shutter blades as mentioned above.

Still further object is to provide a slide shutter using a pivoted lever whose opposite ends are connected to two shutter blades for ganging or interlocking motion as mentioned above.

Still further object of this invention is to provide a slide shutter using a link lever for ganging or interlocking two shutter blades as mentioned above.

Still further object is to provide a slide shutter having an exposure control which is driven by an electromagnetic driving unit.

Still further object of this invention is to provide a slide shutter having an electromagnetic driving means for rotating two shutter blades opposite to each other.

Still further object of this invention is to provide a focal plane shutter in which an electromagnetic driving means drives the leading and trailing shutter blades.

A camera shutter according to this invention uses an electromagnetic driving means which comprises a moving coil operatively connected to the shutter blade, a first elongated permanent magnet and a second cylindrical permanent magnet provided around the first elongated permanent magnet, leaving an annular space therebetween for slidably accepting the moving coil, the polarity of the second permanent magnet being opposite to the polarity of the first permanent magnet, whereby the shutter blades are moved when the electric current flows through the moving coil.

In one preferred embodiment according to this invention the center tap of the moving coil is connected to one polarity terminal of a power supply whereas one of the opposite terminals of the moving coil after the other is connected to the other polarity terminal of the power supply, thus causing the shutter blade to move back and forth.

BRIEF DESCRIPTION OF THE DRAWINGS

FIG. 13A shows the releasing or opening position of still further embodiment according to this invention, FIG. 13B shows the closing position of the shutter of FIG. 13A, FIG. 14A shows the closing position of still further shutter according to this invention, and FIG. 14B shows the opening position of the embodiment of FIG. 14A.

DESCRIPTION OF THE PREFERRED EMBODIMENTS

Figure 1:
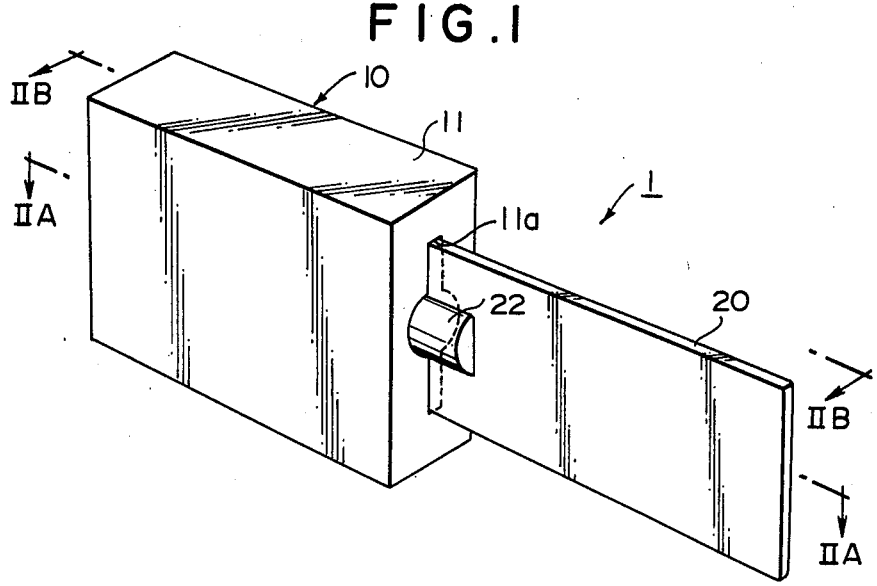
FIG. 1 is a perspective view of an electromagnetic driving means used in a camera shutter according to this invention.
Figure 2A:
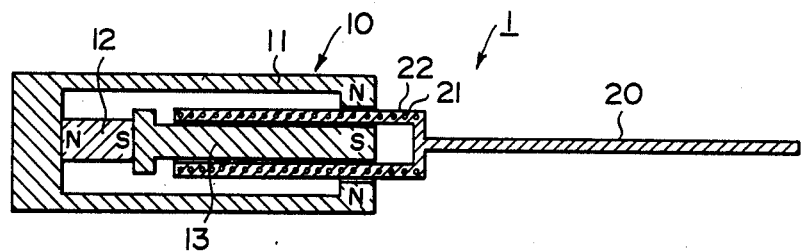
FIG. 2A is a longitudinal section taken along the line IIA—IIA in FIG. 1.
Figure 2B:
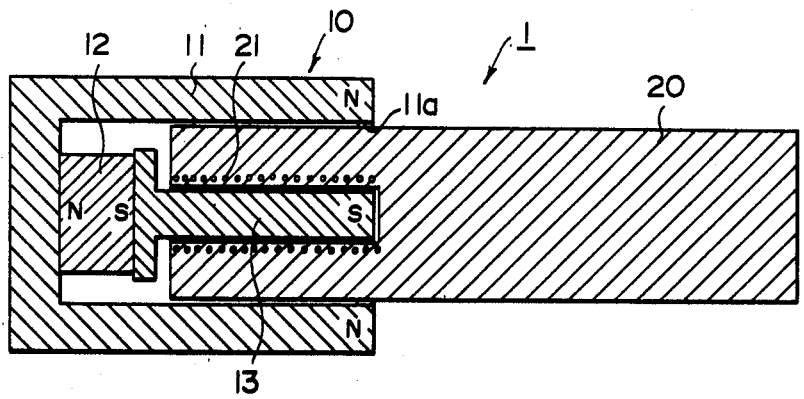
FIG. 2B is a longitudinal section taken along the line IIB—IIB in FIG. 1, FIGS. 3A and 3B show different positions at which the moving coil is attached to the shutter blade.

Referring to FIGS. 1, 2A and 2B, there is shown an electromagnetic driving means for use in a camera shutter according to this invention.

Particularly referring to FIG. 1, an electromagnetic driving means 1 comprises a permanent magnet unit 10 and a bobbin coil 21 to which a shutter blade 20 is integrally connected.

The shutter blade 20 consists of a rectangle plate, which is made of a light and opaque material, as for instance a plastic material containing carbon black. The shutter blade has a cylindrical coil-accepter 22 integrally connected to one end of the rectangle plate. A bobbin coil 21 is inserted in and cemented to the coil-accepter.

As best shown in FIGS. 2A and 2B, the permanent magnet unit 10 comprises a first magnetic body 11 having a recess 11a to allow the bobbin coil 21 of the shutter blade 20 to enter, a permanent magnet 12 attached to the bottom of the recess 11a of the first magnetic body, and a second elongated magnetic body 13 fixed to the permanent magnet 12 and extending to the interior length of the bobbin coil 21 when entering the recess of the first magnetic body. With this arrangement, the polarity of the first magnetic body 11 is opposite to the polarity of the second magnetic body 13. When the bobbin coil 21 is energized, the shutter blade 20 runs in one direction under the magnetic influence resulting from the first and second magnetic bodies 11, 13 and the bobbin coil 21. When the flow of electric current in the bobbin coil 21 is reversed, the shutter blade 20 runs in the other direction. The first and second magnetic bodies 11 and 13 are used to establish at the outside of the bobbin coil, the polarity of magnet which is opposite to the polarity of magnet at the inside of the bobbin coil. The first and second magnetic bodies shown as separate may be of an integrated magnet body. If a magnetic pole is provided at either side of the bobbin coil, the bobbin coil will be driven.

Figure 3A:
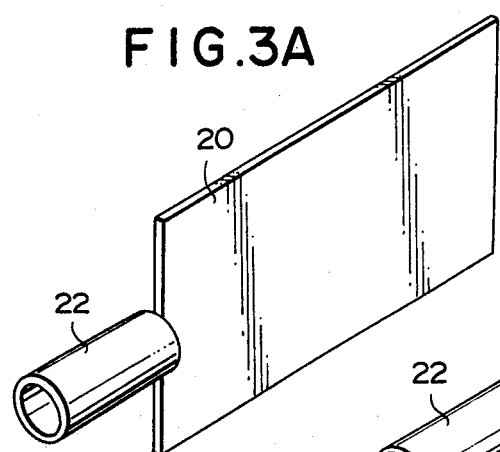
Figure 3B:
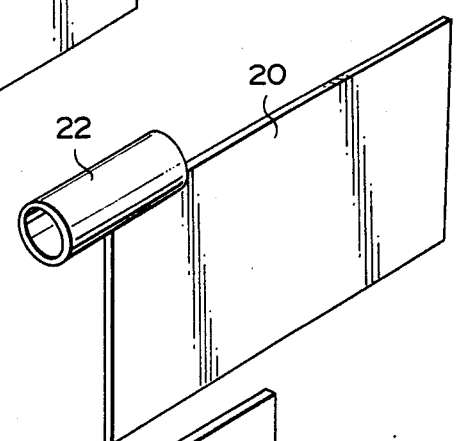

But, if two opposite magnetic poles are provided at the outside and the inside of the bobbin coil as shown in the drawings, the driving force available will be increased, thus allowing the stroke of the shutter blade to be elongated. The word, "permanent magnet" is hereinafter used to indicate the whole structure consisting of the first and second magnetic bodies 11, 13 and the permanent magnet 12. The position at which a bobbin coil is attached to the shutter blade as shown in FIG. 1 should not be understood to be limitative. The bobbin coil acceptor 22 may be attached to the shutter blade 20 at different positions as shown in FIGS. 3A and 3B.

Figure 4A:
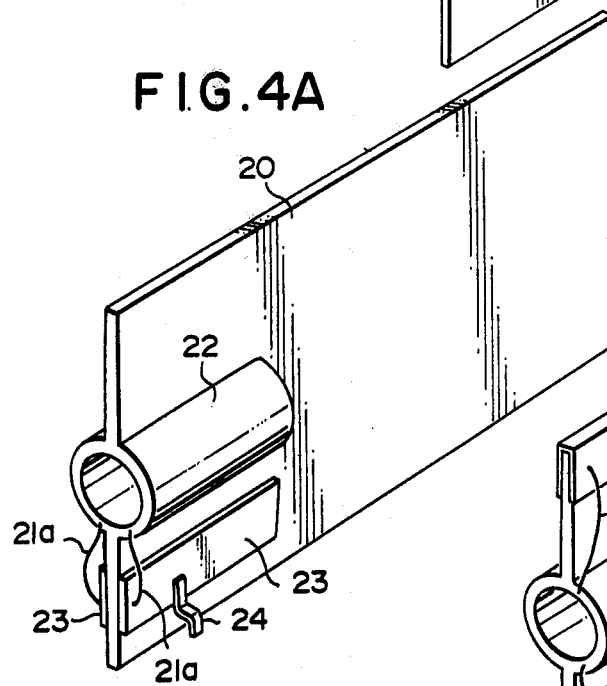
FIGS. 4A and 4B show the manner in which the electric current is supplied to the moving coil.
Figure 4B:
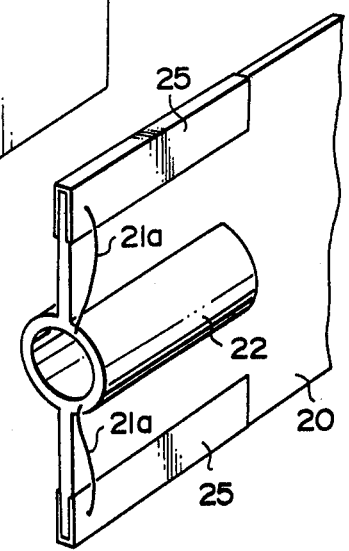

Referring to FIGS. 4A and 4B, there is shown the manner in which the electric current is supplied to the bobbin coil 21. In FIG. 4A, a pair of conductive strips 23 are attached to the opposite surfaces of the shutter blade 20. The strips 23 extend in the same direction as that in which the shutter blade runs. The opposite ends 21a of the bobbin coil are connected to the conductive strips, and brushes 24 are provided at such a position that they contact with the conductive strips 23.

As shown in FIG. 4B, a pair of "U"-shaped conductive strips 25 may be fixed to the upper and lower longitudinal sides of the shutter blade 20, and the opposite ends 21a of the bobbin coil are connected to the conductive strips 25.

The shutter blade 20 when driven, runs along a guide track (not shown), and the length of stroke thereof may be adjusted by providing a stopper in the way of guide track at a desired distance.

In the embodiment as shown in FIG. 2A and described above, the shutter blade 20 is described as partially entering the recess of the permanent magnet. But, in the embodiment as shown in FIGS. 5A and 5B, only the moving coil part of the shutter blade is allowed to enter the recess of the permanent magnet.

Figure 5A:
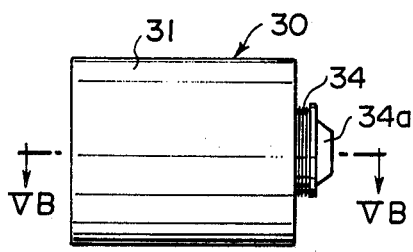
FIG. 5A is a perspective view of another electromagnetic driving means used in the camera shutter according to this invention.
Figure 5B:
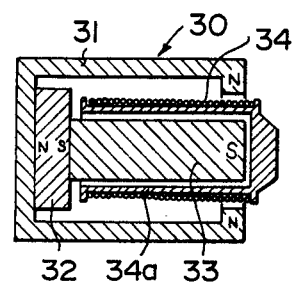
FIG. 5B is a longitudinal section taken along the lines VB—VB in FIG. 5A.

In the electromagnetic driving means 30 as shown in FIGS. 5A and 5B, the first magnetic body 31 is cylindrical, and in the cylindrical space of the magnetic body there are provided a permanent magnet 32 and a second magnetic body 33, as is the case in the electromagnetic driving means described hereinbefore.

A moving coil 34 consists of the winding wound around the bobbin 34a, and the moving coil 34 is slidably inserted in the space between the first and second magnetic bodies 31 and 33. In this electromagnetic driving means the outer surface of the moving coil is exposed. The reciprocation of moving coil 21 or 34 is caused by reversing the flow of electric current in the moving coil, as mentioned hereinbefore.

Figure 6:
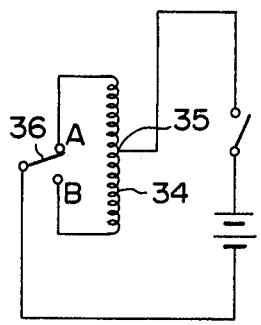
FIG. 6 shows a circuit for reversing the flow of the electric current in the moving coil.

For performing this, for instance, the first and second ends of the moving coil are connected to the positive and negative terminals of the power supply respectively while running in one direction, and the first and second ends of the moving coil are connected to the negative and positive terminals of the power supply respectively while running in the other direction. As shown in FIG. 6, the center tap 35 of the moving coil 34 is continuously connected to one polarity of the power supply, and the opposite ends "A" and "B" of the moving coil 34 are alternately connected to the other polarity of the power supply through a switching means 36.

Figure 7:
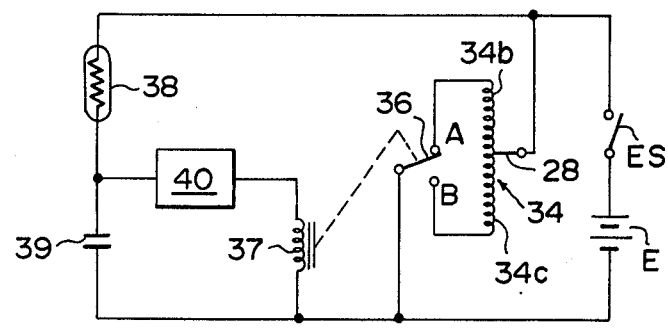
FIG. 7 shows a control circuit for use in a camera shutter according to this invention.
Figure 8A:
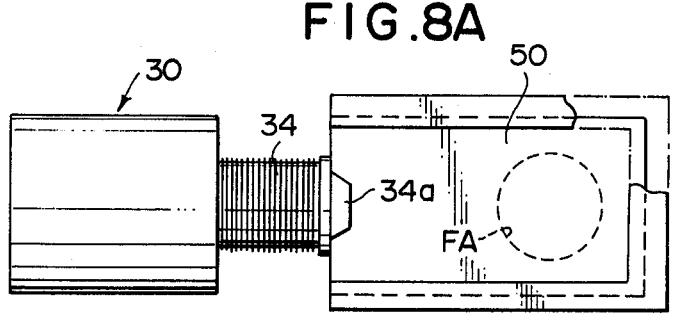
FIGS. 8A and 8B show the closing and opening positions in which the film aperture is closed and opened, respectively.
Figure 8B:
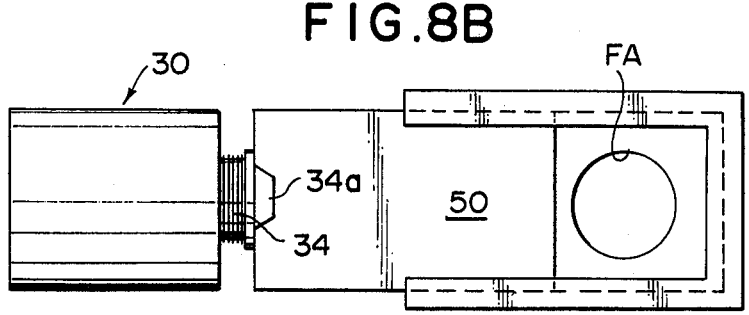

In the embodiment which is about to be described, the supply of the electric current to the moving coil 34 is automatically controlled by a circuit as shown in FIG. 7.

In FIG. 7, the center tap 36 of the moving coil 34 is connected to the positive terminal of the power supply "E" through the switch "ES". The relay contact 36 is caused to selectively connect one of the opposite ends "A" and "B" to the negative terminal of the power supply "E", thus causing the electric current to selectively flow through one of the two halves 34a and 34c of the winding 34. The relay contact 36 is associated with the relay coil 37. The relay coil 37 is controlled by a switching circuit 40, which reverses after a certain length of time determined by the time constant of a photocell 38 and a capacitor 39.

Referring to FIGS. 8-14, there are shown camera shutters according to this invention. Particularly in FIGS. 8A and 8B there is shown a single blade type shutter according to this invention. In these drawings, a shutter blade 50 is fixed to a bobbin 34a. The shutter blade 50 is normally put in the closing position where the film aperture FA is closed. When the electric current flows in the half 34c of the moving coil 34, the blade travels to the left on the guide track of the frame 51, thus opening the film aperture FA. After a certain length of time which is determined by the time constant of the photocell 38 and the capacitor 39 as shown in FIG. 7, the electric current flows in the half 34c of the moving coil 34, and then the shutter blade returns to the original or normal position as shown in FIG. 8A.

Figure 9A:
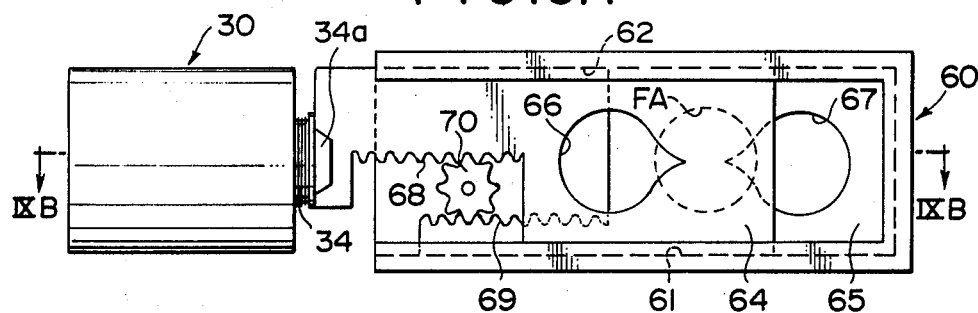
FIG. 9A is a front view of another embodiment according to this invention.
Figure 9B:
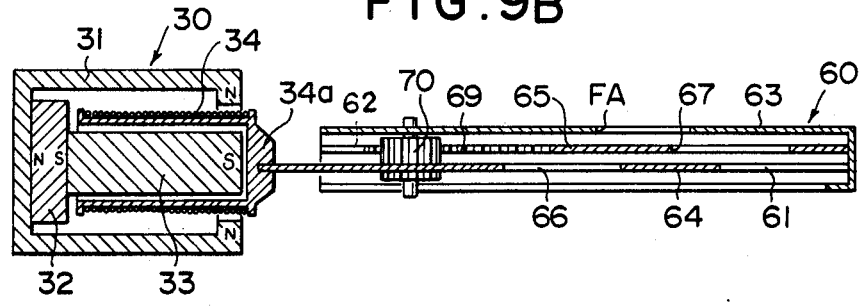
FIG. 9B is a longitudinal section taken along the lines IXB—IXB in FIG. 9A, FIGS. 9C and 9D show different positions of the embodiment as shown in FIG. 9A.
Figure 9C:
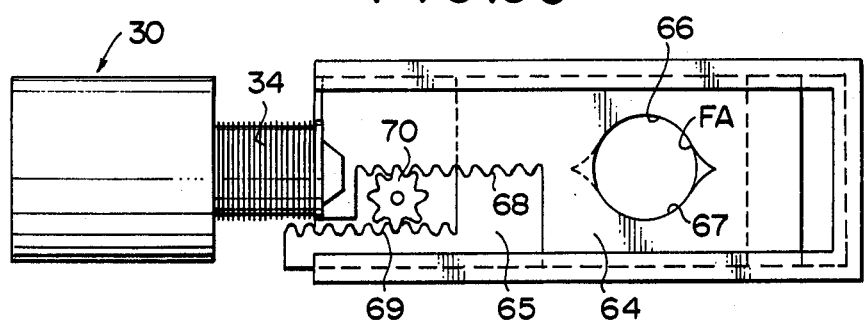

In FIGS. 9A-9D there is shown one embodiment in which this invention is applied to a slide shutter. In FIGS. 9A and 9B, a "U"-shaped guide frame 60 has upper and lower guide tracks 61 and 62, and an opaque plate 63 having a film aperture "FA" is fixed to the rear side of the guide frame. The first and second shutter blades 64 and 65 are slidably fitted in the guide frame 60. Each shutter blade has an exposure aperture 66 or 67 at the center thereof. In the closing position the exposure apertures of the shutter blades are offset with respect to the film aperture "FA" as shown in FIG. 9A, whereas in the opening position the exposure apertures of the shutter blades are aligned on the film aperture. The shutter blades are adapted to move between the closing and opening position.

A pinion gear 70 engages the rack portions 68 and 69 of the first and second shutter blades 64 and 65. When the pinion 70 is rotated, the first and second shutter blades are moved in the opposite directions to each other at the same speed. The moving coil 34 is integrally connected to the left end of the first shutter blade 64, and when the electromagnetic driving means is actuated, the first shutter blade 64 is drawn leftward, thus causing the second shutter blade 65 to move rightward via the rack and pinion mechanism to the opening position in which the exposure windows 66 and 67 of the first and second shutter blades are put in alignment with the film aperture "FA" for exposing the film to light. When the first shutter blade 64 moves to the left, the second shutter blade moves to the right, thus closing the film aperture again.

Assume that the relay switch 36 (FIG. 7) is responsive to the rightward shift of the first shutter blade for switching to the contact "A". The switching circuit 40 is actuated after a certain length of time which is determined by the time constant of the photocell 38 and the capacitor 39, and hence varies with the degree of brightness of an object to be photographed, and then the contact arm 36 is shifted to the contact "B". As a result the flow of the electric current in the moving coil 34 is reversed, thus causing the first shutter blade 64 to move to the left for closing the shutter.

Figure 9D:
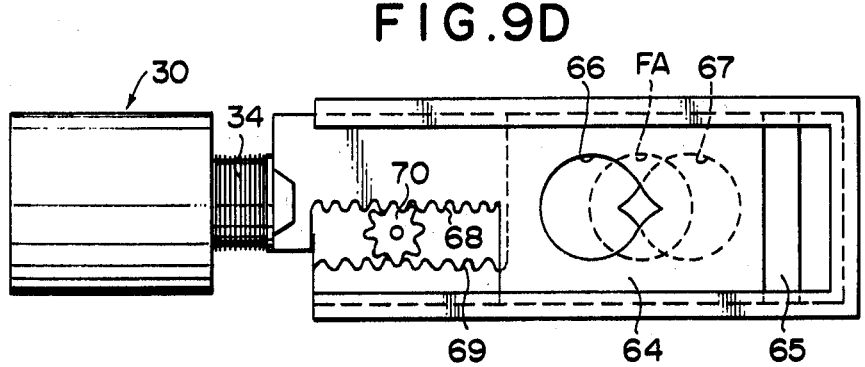

If the object to be photographed is relatively dark, the length of time which is taken before the switching action is long enough for the first and second shutter blades to reach the full opening position. If the object to be photographed is relatively bright, the switching action will occur in a relatively short length of time, thus causing the first and second shutter blades to stop and return when the exposure windows 66 and 67 of the first and second shutter blades partially lie on each other as shown in FIG. 9D. Thus, the programmed control is performed.

Figure 10:
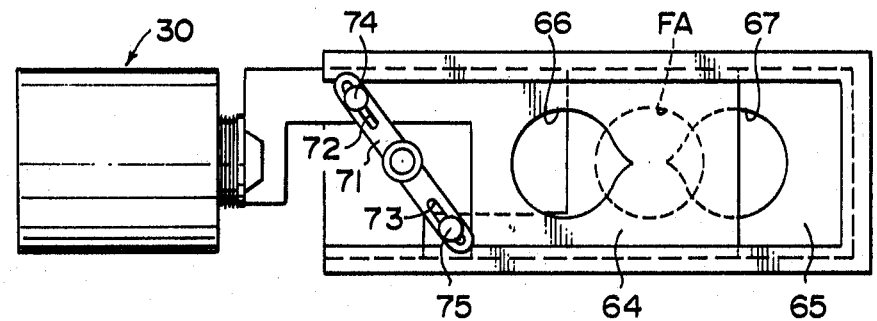
FIG. 10 is a front view of still another embodiment according to this invention.

As an alternative for the rack and pinion to move the first and second shutter blades in the opposite directions, an interlock lever may be used. As shown in FIG. 10, an interlock lever 71 is connected to the first and second shutter blades. The interlock lever having two slits 72 and 73 at both ends is pivotally mounted at the center thereof. The studs 74 and 75 of the first and second shutter blades 64 and 65 are fitted in the slits 72 and 73 of the interlock lever 71. With this arrangement, if the first shutter blade 64 moves, the interlock lever 71 will rotate, thus causing the second shutter blade 65 to move in the opposite direction at the same speed.

Figure 11A:
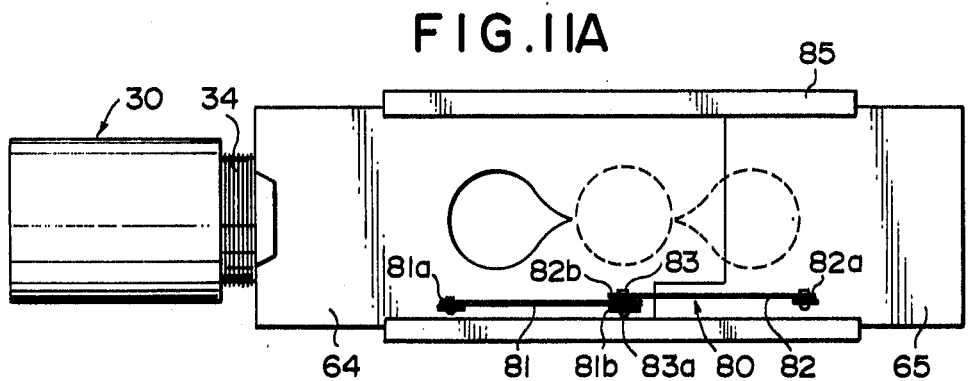
FIG. 11A shows still further embodiment according to this invention.
Figure 11B:
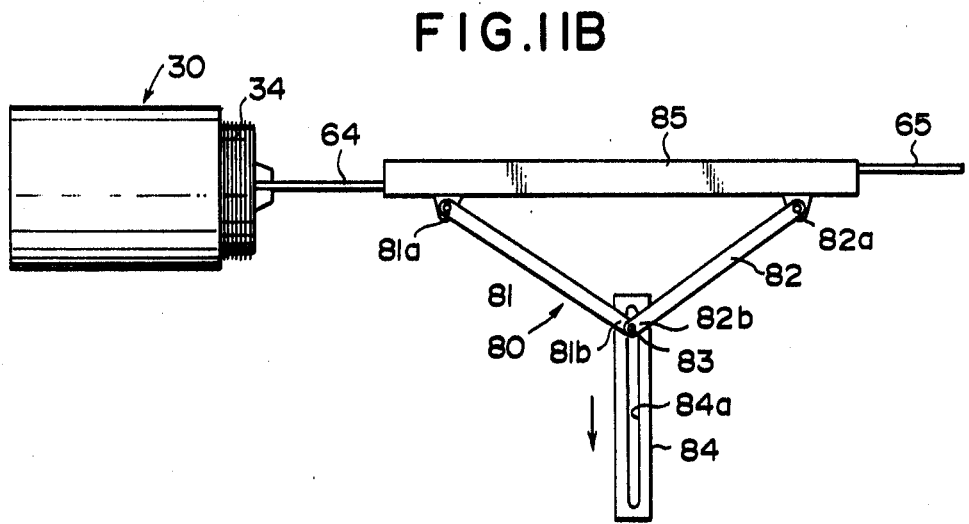
FIG. 11B is a plan view of the embodiment as shown in FIG. 11A.

In FIGS. 11A and 11B there is shown another interlock device for coordinating the first and second shutter blades in running. This embodiment is the same as those shown in FIGS. 8-10 and described above except for the interlock means, and therefore only the interlock means is described. In FIGS. 11A and 11B, the interlock means 80 comprises a pair of link levers 81 and 82, and a guide 84. One end 81a of the first link lever 81 is rotatably connected to the first shutter blade 64 whereas one end 82a of the second link lever 82 is rotatably connected to the second shutter blade 65. The other ends 81b and 82b of the first and second link levers 81 and 82 are rotatably connected to each other by a pin 83. This pin 83 passes through the other ends of the first and second link levers, and slidably fits in the guide channel 84a of the guide 84. The guide channel 84a is below the film aperture "FA", extending in the direction perpendicular to the first and second shutter blades 64 and 65.

If the first shutter blade 64 moves to the right, one end 81a of the first link lever 81 moves to the right, thus causing the pin 83 to move along the guide channel 84a in the direction as indicated by arrow. The first and second shutter blades 64 and 65 are slidably fitted in the guide tracks (not shown) of the guide frame 85. When the pin 83 moves in the direction indicated by arrow, the second shutter blade 65 moves to the left at the same speed as the first shutter blade 64 via the second link lever 82.

Figure 12A:
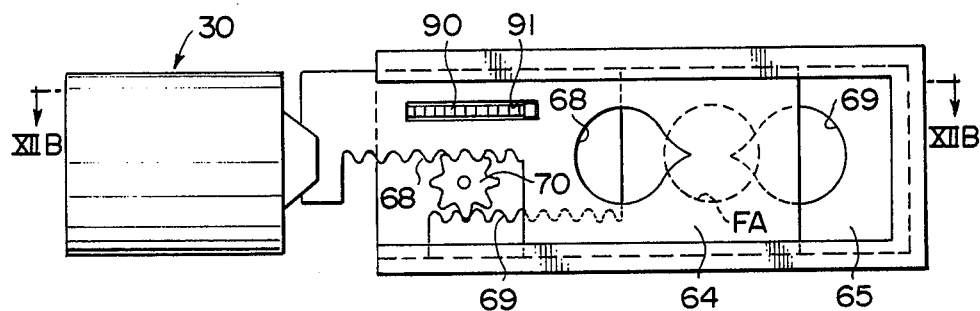
FIG. 12A is a front view of still further embodiment according to this invention.
Figure 12B:
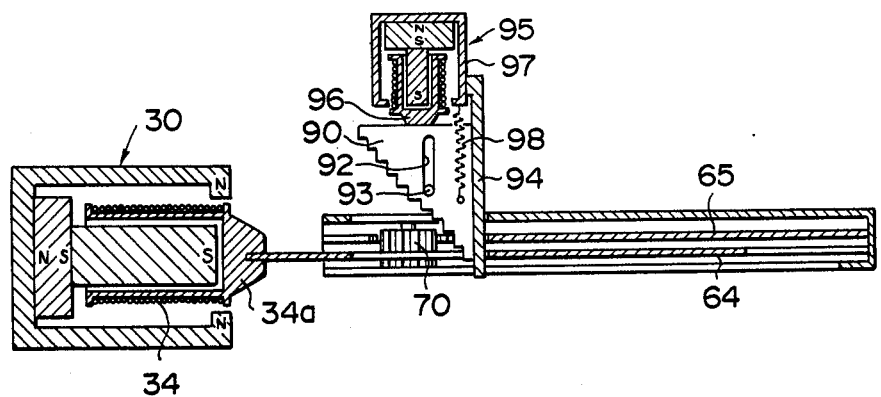
FIG. 12B is a longitudinal section taken along the lines XIIB—XIIB in FIG. 12A.
Figure 12C:
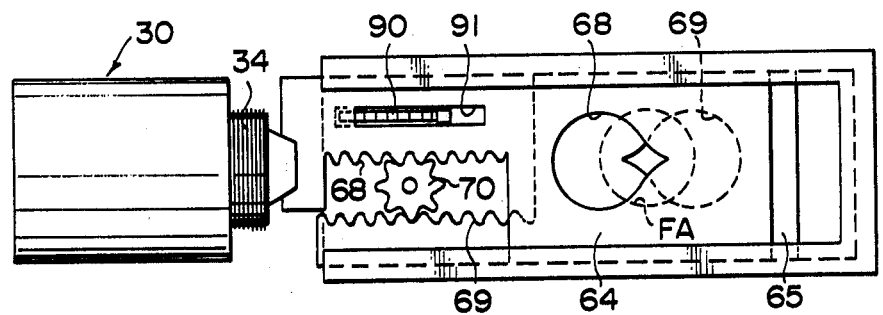
FIG. 12C shows the position in which the shutter of FIG. 12A opens.

Referring to FIGS. 12A, 12B and 12C, there is shown still further embodiment according to this invention. This embodiment consists of the camera shutter of FIG. 9 and an exposure control for program-controlling. Therefore, this embodiment is the same as the camera shutter of FIG. 9 except for the exposure control. In this connection only the exposure control is described in detail. In FIGS. 12A and 12B, the first shutter blade 64 has a slit 91 to accept a step cam 90. This cam 90 extends in the direction perpendicular to the movement of the first shutter blade in such a way that a selected step of the step cam when brought at the same level as the first shutter blade, will abut against the left side of the slit to stop the movement of the first shutter blade, thus limiting the stroke of the first shutter blade and hence controlling the size of the opening formed by the first and second shutter blades.

A pin 93 is inserted in the guide slot 92 of the step cam, and therefore the step cam when pushed, will move straight. The step cam is supported by a reinforcing plate 94 so as to prevent the cam from being damaged when it is struck against the left side of the slit of the first shutter blade.

The step cam 90 is fixed to the bobbin 96 of an electromagnetic driving means 95. This electromagnetic driving means is essentially the same as that which is described above with regard to the driving of the shutter blade. A spring 98 is stretched and connected to the step cam 90 and to the first magnetic body 97 of the electromagnetic driving means 95. The electromagnetic driving means 95 is connected to a light measuring circuit (not shown) so that an electric current which varies with the brightness of an object to be photographed flows in the electromagnetic driving means. The stroke of the step cam 90 is determined when the electromagnet force due to the electric current is balanced with the resilient force of the spring, thus program-controlling the stroke of the first and second shutter blades 94 and 95.

If an electric current which is proportional to the brightness of an object to be photographed is supplied to the electromagnetic driving means 95, the step cam 90 proceeds until the electromagnetic force is balanced with the resilient force of the spring 98. The electromagnetic driving means for opening and closing the shutter blades is energized after or at the time of actuating the electromagnetic driving means 95. Then, the first shutter blade 64 moves to the right, thus causing the second shutter blade 65 to move to the left via the rack and pinion 70. Consequently the exposure windows 68 and 69 of the shutter blades come closer to each other with regard to the film aperture "FA", thus increasingly exposing the film to the light. When the first shutter blade 64 moves a certain preset distance, the left side of the slit 91 of the first shutter blade 64 abuts against a selected step of the step cam 90, and stops there. In this way the size of exposure opening is adjusted in terms of the brightness of an object to be photographed, as shown in FIG. 12C. As is apparent from the above, the stroke of the step cam 90 is determined in terms of the brightness of an object to be photographed, and then the stroke of the shutter blades 64 and 65 is determined in connection with the stroke of the step cam, so that the size of exposure opening is adjusted to the proper value.

After the length of time which is determined from the brightness of the object to be photographed, or after a certain preset length of time the electric current flows in the half of the coil winding of the electromagnetic driving means for actuating the shutter blades, thus causing the first shutter blade 64 to move to the left for closing the film aperture "FA". If the shutter blades 64 and 65 are caused to return immediately after the first shutter blade has abutted against the step cam, the program control can be performed.

If the flow of electric current in the electromagnetic driving means 95 is made to cease at the time of closing the film aperture "FA", the step cam 90 is drawn to the start position under the resilient influence of the spring 98.

In the embodiment above mentioned, the stroke of the electromagnetic driving means 95 is controlled in terms of the brightness of an object to be photographed. Alternatively the stroke of the electromagnetic driving means 95 may be controlled by a manually-set electric signal or an electric signal which varies with distance in a flash light photographing condition.

In the embodiments as shown in FIGS. 8 to 12, the opening and closing of the film aperture is performed by reciprocating the shutter blades. Alternatively it may be performed by rotating the shutter blades.

Referring to FIGS. 13A and 13B, there is shown an embodiment according to this invention in which the opening and closing of the shutter is performed by rotating a pair of shutter blades. As shown in FIG. 13A, the first and second shutter blades 101 and 102 have opaque enlargements 101a and 102a respectively, and when the shutter blades are put in the overlying position, the opaque enlargements thereof are partially laid on each other. The shutter blades are pivoted to each other at the crossing point as shown in the drawing. Therefore, the shutter blades are capable of rotating about the center axis 103 in such opposite directions that the opaque enlargements 101a and 102a are brought and laid on each other so as to close the film aperture (closing position) or in such opposite directions that the opaque enlargements 101a and 102a are brought apart from each other so as to open the film aperture (opening position).

Each shutter blade has an end extension, and the end extension has a cam slot 104 or 105. The stud pins 107 and 108 of an actuator 106 are fitted in the cam slots 104 and 105 of the first and second shutter blades 101 and 102 respectively. When the stud pins 107 and 108 move straight, the end extensions of the shutter blades are pushed or pulled so as to put the opaque enlargements 101a and 102a in the opening or closing position. As shown in FIGS. 13A and 13B, the actuator 106 has a guide slot 109 and a stationary pin 110 is fitted in the guide slot 109 of the actuator, thus assuring the straight or linear movement of the actuator. The actuator 106 is operatively connected to the electromagnetic driving means 30, and is reciprocated when the electromagnetic driving means 30 is energized.

Specifically, when an electric current flows in the electromagnetic driving means 30, the moving coil 34 and hence the actuator 106 move to the right so that the end extensions of the first and second shutter blades open wide through the interaction between the stud pins 107 and 108 of the actuator 106 and the slots 104 and 105 of the end extensions of the shutter blades. Thus, the opaque enlargements 101a and 102a of the shutter blades are brought apart from each other, withdrawing from the film aperture "FA". When the electric current flows in the moving coil 34 in the opposite direction, the moving coil 34 moves to the left so as to put the shutter blades in the closing position where the light is prevented from falling in the film aperture, as shown in FIG. 13B.

In the embodiment of FIGS. 13A and 13B, the shutter blades are pivoted so that the opaque enlargements of the shutter blades move in opposite directions. Alternatively, the shutter blades is pivoted at one end, and a guide slot is made at the crossing part of the shutter blades, and a pin is fitted in the guide slot. With this arrangement, if the pin is moved along the guide slot, the shutter blades rotates about the pivot.

Where the guide slot are made in the middle of the shutter blades, the electromagnetic driving means can be laid on the shutter blades so as to reduce the whole length of the camera shutter.

Referring to FIGS. 14A and 14B, there is shown a focal plane shutter to which this application is applied. In FIG. 14A two electromagnetic driving means are positioned in the symmetric relation with regard to the film aperture "FA". The leading shutter blade 122 is fixed to the top of the moving coil 121 of the first electromagnetic driving means 120, whereas the trailing shutter blade 132 is connected to the top of the moving coil 131 of the second electromagnetic driving means 130. The shutter blades 122 and 132 are slidably fitted in the guide frame (not shown).

In FIG. 14A, the moving coil 121 for driving the leading shutter blade 122 projects the full length thereof from the permanent magnet 123, thus closing the film aperture "FA". On the other hand, the moving coil 131 for driving the trailing shutter blade 132 is drawn in the permanent magnet 133. The ends of the leading and trailing shutter blades are overlapped with each other so as to prevent the light from leaking and falling in the film aperture.

When the shutter button is depressed, an electric current flows through the moving coil 121 of the first electromagnetic driving means 120 so as to move the leading shutter blade 122 to the left for opening the film aperture. After a certain length of time which is predetermined by the shutter speed control circuit, the electric current flows in the moving coil 131 of the second electromagnetic driving means 130, and then the trailing shutter blade 132 moves to the left for closing the film aperture "FA". In this closing position, the ends of the leading and trailing shutter blades are overlapped with each other. The moving coils 121 and 131 are responsive to the wind-up of the film for allowing the electric current to flow through the moving coils, thus starting at the same time and running at the same speed.

I claim:

1. In a shutter device for a photographic camera, the combination of, a permanent magnet unit comprising an elongated central pole and an outer pole extending parallel thereto, said poles being of opposite polarity and forming a magnetic gap at one end of said central pole, shutter means including a pair of shutter blades each of which has an exposure window, said blades being positioned in side-by-side relationship and being adapted to move longitudinally of a common center line progressively between an exposure position in which said windows are in alignment and a non-exposure position in which the window in each of said blades is closed by the other of said blades, means mounting said blades for said longitudinal movement, said common center line being in substantial alignment with the central portion of said central pole, an electromagnet operatively connected to one of said blades and positioned around said central pole and adapted to move longitudinally through said magnetic gap, means constituting an electric power source including control means to supply electric current to said electromagnet and to reverse the direction of flow therethrough whereby said electromagnet is moved back and forth along an operating path parallel to said common center line, said electromagnet being operatively connected to one of said blades, means mechanical interconnecting said blades whereby said movement of one of them in one direction causes the other blade to move simultaneously in the other direction, a step cam positioned to move perpendicular to said longitudinal movement of said blades and having a plurality of steps each of which provides a stop surface which is transverse to said common center line, said step cam being operatively related to one of said blades whereby it presents a stop surface to the blade and thereby limits the blade movement in one direction, said stop surfaces being spaced from each other in the direction parallel to said common center line whereby the position of said step cam determines which of said stop surfaces limits the movement of the blade, and means to control the position of said step cam to thereby determine the step surface on the respective step which is engaged by the blade and hence the size of the exposure opening provided by overlapping portions of said windows in said plates.

2. The construction as described in claim 1 wherein said means to control the position of said step cam comprises an electromagnetic driving means which is responsive to an electrical signal for controlling the size of the exposure opening including a movable coil connected to said step cam, an elongated permanent magnet having a first pole positioned within said coil and a second pole forming a magnetic gap with said first pole and of opposite polarity at said gap, the amount of current flowing through the coil being effective to produce a controlled force urging said step cam in one direction in its path of movement.

3. The construction as described in claim 2 which includes light-intensity measuring means which is connected to supply current to said movable coil and which produces an amount of electric current which varies depending upon the brightness of the object to be photographed.

4. The construction as described in claim 3 which includes a spring which is connected to said step cam and produces a spring bias force which opposes the force produced by said moving coil whereby said forces balance with said step cam being in a position depending upon said brightness of the object to be photographed.

5. The construction as described in claim 2 wherein the operative relationship between said step cam and one of said blades is formed by a slot in the blade into which said step cam projects.

* * * * *